ically rigid mounting bar embedded into a tree, a substantially rigid seat supporting frame removably secured to the mounting bar, and a seat mounted to swivel on the seat supporting frame. The mounting bar includes two 90 degree bends to form an anchoring segment embedded into the tree, a vertical medial segment and a horizontal handle segment. An elongate receiving sleeve is fixed to the medial segment, vertically disposed, and open at least at the top to receive an elongate coupling sleeve of the supporting frame for a nesting engagement with the receiving sleeve. The handle segment underlies the receiving sleeve, to support the coupling sleeve by gravity when the coupling sleeve is nested within the receiving sleeve. A seat is pivotally mounted to a distal region of the supporting frame. A rod, permanently fixed to the distal region, is insertable into the receiving sleeve, whereby the supporting frame can be used as a tool for installing or removing the mounting bar.

United States Patent [19]

Lyzhoft et al.

[11] Patent Number: 5,269,395
[45] Date of Patent: Dec. 14, 1993

[54] PORTABLE TREE MOUNTED SEAT

[76] Inventors: Roger R. Lyzhoft, 409 Ortloff Trail, Watertown, Minn. 55388; James A. Lenz; Sue A. Lenz, both of 13087-183rd Ave., NW., Elk River, Minn. 55330

[21] Appl. No.: 952,003

[22] Filed: Sep. 28, 1992

[51] Int. Cl.⁵ .............................. A01M 31/00
[52] U.S. Cl. .......................... 182/187; 182/92
[58] Field of Search ............ 182/187, 188, 92, 90

[56] References Cited

U.S. PATENT DOCUMENTS

| 601,849 | 4/1898 | Acker | 182/92 |
| 614,177 | 11/1898 | McBride | 182/92 |
| 3,298,459 | 11/1967 | Bergsten | 182/92 |
| 4,819,763 | 4/1989 | Groft | 182/187 |

Primary Examiner—Alvin C. Chin-Shue

[57] ABSTRACT

A portable, tree mounted seat assembly includes a sub-

16 Claims, 3 Drawing Sheets

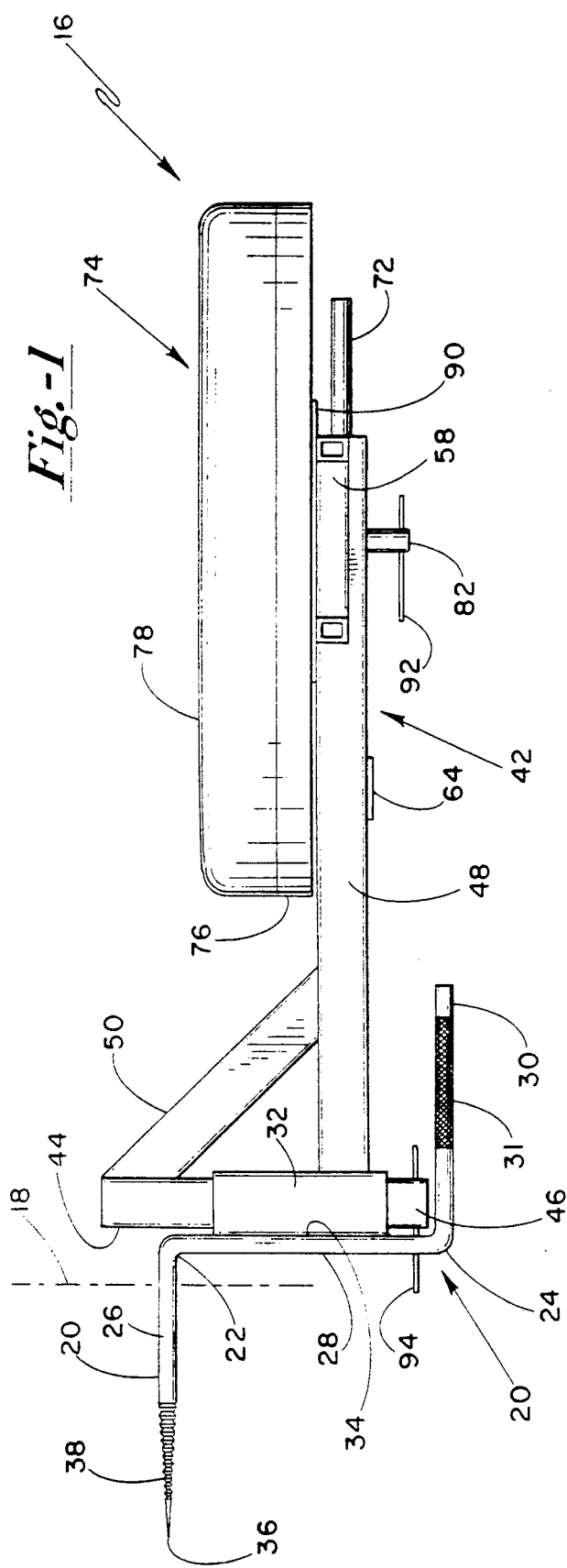
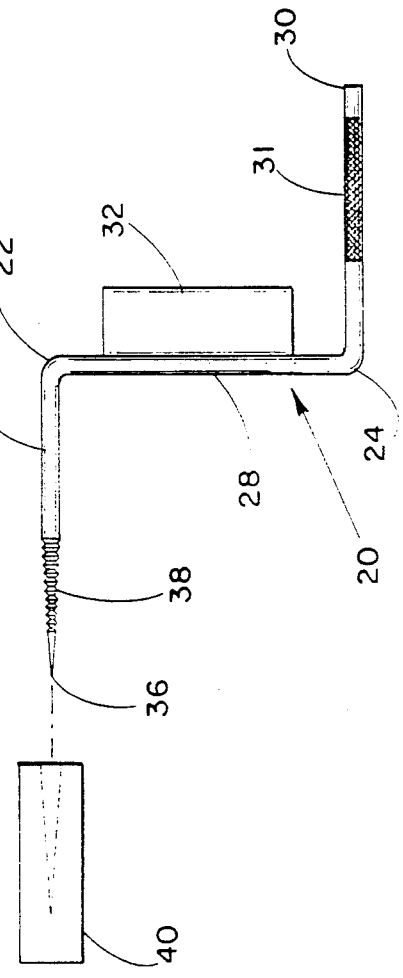
Fig.-1
Fig.-2

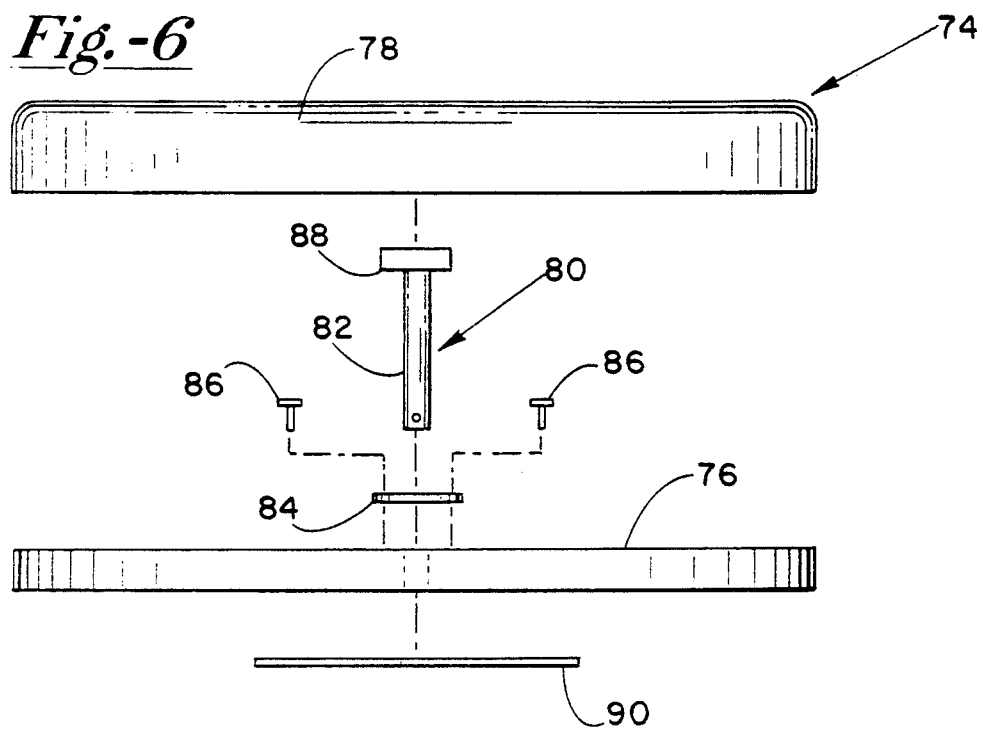
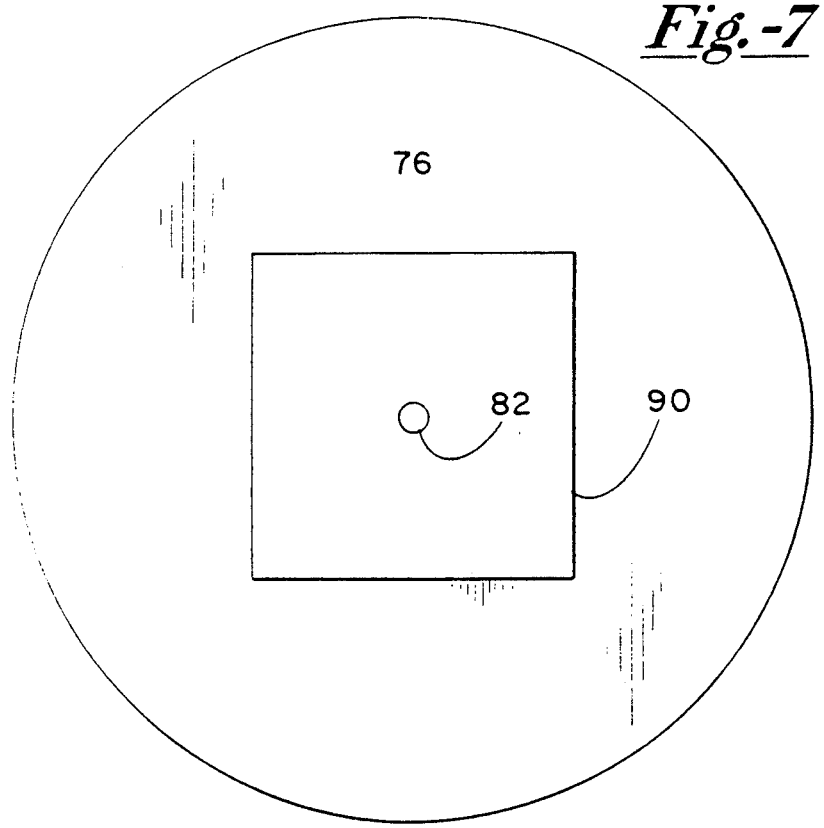

PORTABLE TREE MOUNTED SEAT

BACKGROUND OF THE INVENTION

The present invention relates to devices mounted to trees, vertical posts and the like for supporting individuals above ground, and more particularly to portable seats, platforms and other support members removably secured to trees or posts.

Hunters, photographers, and others who frequent the outdoors often find it necessary or desirable to maintain a position above ground for observing the activity of wildlife below. As periods of observation can be lengthy, it is preferred to provide a comfortable means for supporting the observer. To this end, a variety of devices have been proposed. For example, U.S. Pat. No. 4,708,221 (Kubiak) discloses a tree stand with a support system including a hanger pin suited for mounting to a tree trunk. The hanger pin includes a threaded, pointed end, a crank handle, and a holder area formed to provide a rectangular opening. A rectangular hanger stud, mounted to a U-shaped frame through a bracket, can be slipped into the rectangular opening whereby the hanger pin and a belt support the tree stand.

Another device involving a crank is shown in U.S. Pat. No. 3,729,160 (D'Imperio). A tree seat illustrated in this patent includes a seat member and a support rod with a threaded arm secured into the tree trunk. Another portion of the support rod underlies and supports the seat. An intermediate portion of the support rod joins the threaded portion and the underlying portion in such a way that the underlying portion can be manipulated as a crank to insert or remove the threaded portion.

Yet another approach is shown in U.S. Pat. No. 3,719,252 (Tiley), in which a seat is supported by a rod that extends horizontally along the seat and includes a converging, threaded end that penetrates a tree or post to support the seat. Further support for the seat is provided by a pair of legs pivotally mounted to a lug beneath the seat. These legs have pointed, nonthreaded ends that penetrate the tree or post. U.S. Pat. No. 3,990,537 (Swenson) discloses a seat that swivels on a bracket, with the bracket in turn mounted to the tree through a penetrating threaded fastener. A peg is pivotally mounted beneath the seat and supports the seat in much the same manner as the aforementioned legs of the Tiley patent.

While the above and other devices are perhaps well suited for certain purposes, there remains a need for a portable seat or stand that can be mounted quickly and conveniently, yet is sufficiently rigid to provide firm, secure support for the hunter or other individual using the device.

Therefore, it is an object of the present invention to provide a portable device that can be mounted to a tree, pole or the like for supporting an individual above ground in relative comfort and with freedom of movement.

Another object is to provide a tree mounted support assembly including a mounting framework embedded into a tree, in combination with a supporting framework that is removably mounted to the mounting framework, and can be quickly and conveniently mounted onto or detached from the mounting framework.

Yet another object is to provide a tree mounted support assembly including framework embedded into a tree or pole for relatively permanent positioning, in combination with a removable, portable framework including a seat or platform.

SUMMARY OF THE INVENTION

To achieve these and other objects, there is provided a portable, tree mountable support assembly. The assembly includes a substantially rigid mounting framework including an elongate anchoring segment and an elongate receiving means substantially perpendicular to the anchoring segment. The anchoring segment includes means at one end thereof to facilitate penetration of the anchoring segment into a tree trunk, pole or the like. The anchoring segment is substantially horizontal and selectively angularly positionable to orient the receiving means vertically. The support assembly further includes a substantially rigid supporting framework removably mounted to the mounting framework. The supporting framework includes an elongate coupling means slidable toward and away from a nesting engagement with the receiving means. The coupling means is maintained in the nesting engagement by gravity. The mounting framework further includes an elongate frame member joined to the coupling means and extending horizontally away from the tree trunk when the coupling means is in the nesting engagement. A support member is mounted on the frame member.

Preferably, the mounting framework further includes a handle segment joined to the receiving means and spaced apart from the anchoring segment. The preferred penetration facilitating means is a converging threaded end portion of the anchoring segment. With the handle segment and anchoring segment parallel to one another, the handle segment and receiving means can be used as a crank for rotating the anchoring segment, to effect either its penetration into or removal from the tree.

The preferred receiving means is an elongate rectangular receiving tube, with the coupling means comprising an elongate and rectangular coupling tube. The coupling tube exterior profile dimensions are slightly less than corresponding horizontal interior profile dimensions of the receiving tube. As a result, the coupling tube nests within the receiving tube.

The frame means can be comprised of an elongate horizontal rectangular tube, and an inclined brace secured to the horizontal tube and to the coupling tube. In one advantageous arrangement, the handle segment is disposed directly below the receiving tube. A lower portion of the coupling tube projects below the receiving tube to abut the handle segment, and therefore is supported by gravity. A top portion of the coupling tube projects upwardly beyond the receiving tube, with the brace being secured to that top portion. In this arrangement, the horizontal tube and coupling tube are spaced apart from one another to define a gap. By virtue of the gap, the horizontal tube and coupling tube are disposed on opposite sides of a vertical wall of the receiving tube. Preferably the gap width slightly exceeds the vertical wall thickness, so that a downward force applied to the distal end of the horizontal tube tends to urge the proximal end of the horizontal tube against the receiving tube.

A preferred support member is a seat having a rigid, horizontal platform and an elastically deformable cushion secured onto the platform. The platform preferably is mounted to rotate on a vertical axis with respect to the supporting framework, e.g. by a pivot pin fastened to the platform and depending downwardly from the platform, and a vertical opening through a distal portion of the elongate frame member for receiving the pivot pin. The platform can be constructed of plywood, with a layer of plastic secured to the bottom of the platform and disposed between the platform and supporting framework. The plastic layer enhances pivoting and improves the wear characteristics of the seat.

A salient feature of the present invention is the combination of a mounting framework and support framework removably secured to the mounting framework, by a nesting engagement in which the support framework is maintained solely due to gravity. This enables a long term or relatively permanent fixation of the mounting framework into the tree trunk or pole, in combination with short term mounting of the supporting framework. More particularly, the mounting framework can be embedded into a tree for several months or longer, while the supporting framework and seat are secured onto the mounting framework only during use, e.g. for a few hours, and then removed. The supporting framework and seat are light weight, easily carried to and from the observation site, and are quickly and conveniently installed or removed from the mounting framework.

The mounting framework, when left at the observation site for several months, tends to become firmly embedded into the tree or pole, to the point of presenting difficulty in its removal. To overcome this difficulty, the supporting framework can include a tool segment. The tool segment, when removably inserted into the receiving tube of the mounting frame, facilitates use of the supporting framework to rotate the anchoring segment to remove the mounting framework from the pole or tree. The tool segment also enables use of the supporting framework to install the anchoring segment into a tree or pole.

Thus, in accordance with the present invention a portable, tree mounted support assembly includes a relatively permanently secured mounting framework in combination with a portable supporting framework removably supported by gravity, relative to the mounting framework. The mounting framework is constructed of steel or other material enabling it to withstand the outdoor environment for the long term. The removable supporting framework and seat need not be constructed to withstand long term exposure to the environment, as they are removed from the observation site following each use. When the need arises to transfer the mounting framework to a different observation site, the supporting framework, including its tool segment, is conveniently employed to remove the mounting framework.

IN THE DRAWINGS

For a further understanding of the above and other features and advantages, reference is made to the following detailed description and to the drawings, in which:

FIG. 1 is a side elevation of a tree mounted seat assembly constructed in accordance with the present invention;

FIG. 2 is a side elevational view of a mounting framework of the seat assembly;

FIG. 6 is an exploded side view of a seat and seat mounting structure forming part of the seat assembly; and FIG. 7 is a bottom plan view of the seat.

DESCRIPTION OF THE PREFERRED EMBODIMENT

Figure 3:
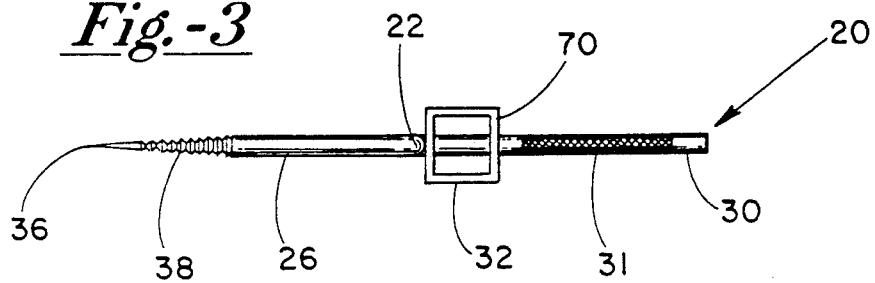
FIG. 3 is a top plan view of the mounting framework.

Turning now to the drawings, there is shown in FIG. 1 a tree mounted seat assembly 16, secured to a tree trunk represented by a vertical broken line 18. The seat assembly includes a mounting bar 20 having two 90 degree bends at 22 and 24 to define a horizontal anchoring segment 26, a vertical medial segment 28 and a horizontal handle segment 30. A portion of the handle segment is gnarled, as seen at 31. A sleeve or receiving tube 32, constructed of 1" channel steel, is secured to medial segment 28 by a weld 34. As best seen in FIG. 3, sleeve 32 is aligned with the medial segment in a manner to substantially center the sleeve over handle segment 30.

Mounting bar 20 is secured to tree trunk 18, or to a vertical pole, post or other member by embedding anchoring segment 26. To facilitate installing the mounting bar, the free end of the anchoring segment converges to a pointed tip 36 and is threaded as indicated at 38. Medial segment 28 and handle segment 30 cooperate to provide a crank, which is employed to rotate the anchoring segment to install, or alternatively remove, the mounting bar. As seen in FIG. 2, a cap 40 in the form of a wooden dowel can be threadedly secured to anchoring segment 26 when the mounting bar is removed from the tree, to protect tip 36 and prevent injury from inadvertent contact with the tip.

With anchoring segment 26 substantially horizontal and tip 36 against tree 18, handle segment 30 is used to rotate the anchoring segment and thus embed the anchoring segment into the tree. Rotation of the anchoring segment continues until the segment is firmly embedded, with medial segment 28 oriented substantially vertically to position handle segment 30 below the anchoring segment as illustrated in FIG. 1.

Figure 4:
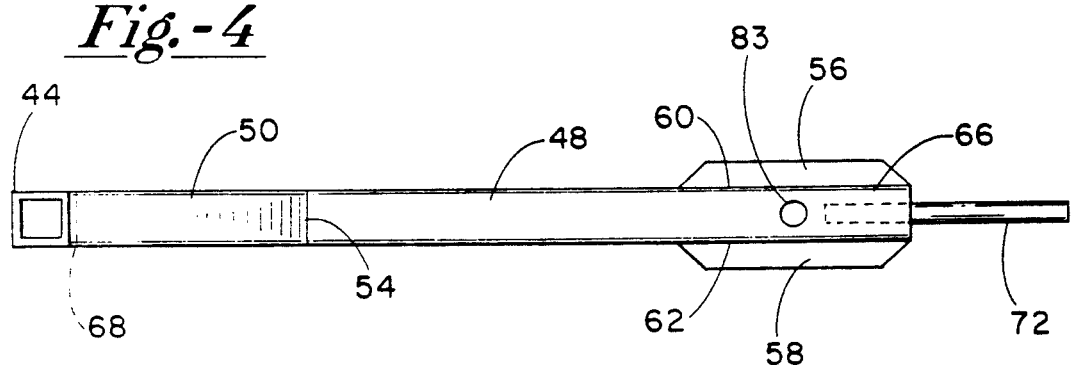
FIG. 4 is a top plan view of a seat supporting framework of the seat assembly.
Figure 5:
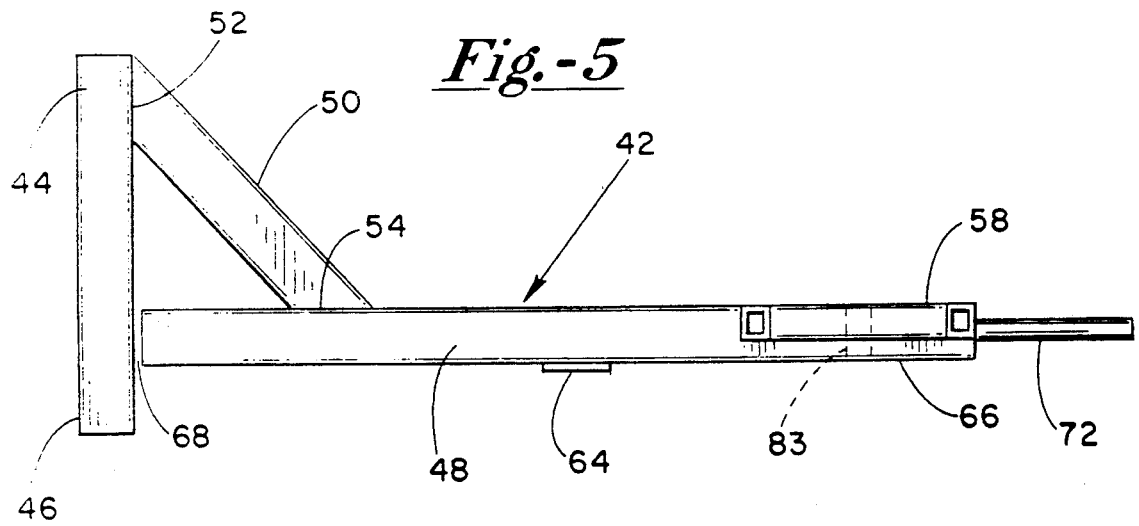
FIG. 5 is a side elevation of the seat supporting framework.

As seen in FIGS. 4 and 5, a supporting frame 42 of seat assembly 16 includes a vertical coupling tube or sleeve 44 constructed of ⅞" steel channel stock. Thus, coupling sleeve 44 has a rectangular transverse (horizontal) profile substantially similar to a transverse or horizontal profile of receiving sleeve 32. The exterior dimensions of the coupling sleeve profile are slightly less than the corresponding interior dimensions of the receiving sleeve. As a result, coupling sleeve 44 is slidable vertically relative to receiving sleeve 32, toward and away from a nesting engagement within the receiving sleeve as illustrated in FIG. 1. When nested in this fashion, coupling sleeve 44 has a lower portion 46 that projects downwardly beyond the receiving sleeve into surface engagement with handle segment 30. Thus, coupling sleeve 44 and the remainder of supporting frame 42 are maintained by gravity, fixed relative to the tree and the mounting bar. The remainder of the seat supporting frame 42 includes an elongate horizontal tube 48 and an inclined brace 50 for coupling the horizontal tube to coupling sleeve 44 by welds at 52 and 54. Horizontal tube 48 and brace 50 are constructed of ⅞" steel channel stock. The supporting frame further includes a pair of tubular platform support members 56 and 58 constructed of ½" steel channel stock. The platform support members are fixed to the horizontal tube by welds along interfaces 60 and 62, and cooperate with the distal end region of tube 48 to support a seat, stand or platform.

A ring or bracket 64 is secured to the bottom of horizontal tube 48, for anchoring a strap (not shown) conveniently employed to carry the seat and seat supporting framework.

Horizontal tube 48 has a proximal end 66 that is spaced apart from coupling sleeve 44 to provide a gap 68 between the coupling member and tube (FIG. 5). The width of gap 68 is slightly greater than the thickness of a vertical wall 70 of receiving sleeve 32. Consequently, when coupling sleeve 44 is nested within receiving sleeve 32 as shown in FIG. 1, proximal end 66 of the horizontal tube abuts or nearly abuts wall 70 of the receiving sleeve. Any downward force at the distal end of horizontal tube 48, e.g. from the weight of an individual supported on a seat or platform on the supporting frame, tends to move proximal end 66 into contact with the receiving sleeve, i.e. to the left as viewed in FIG. 1. Thus, sleeve 32 and tube 48 contribute to the support of the individual.

A 7/16" diameter steel rod 72 is welded to the distal end region of horizontal tube 48, and extends distally beyond tube by approximately 2". Rod 72 facilitates the use of supporting frame 42 as a tool to install or remove mounting bar 20, as is later explained.

As seen in FIG. 6, a seat 74 includes a substantially planar and disc shaped platform 76, and a disc shaped, elastically deformable cushion 78 secured to a top surface of the platform, e.g. with an adhesive. Platform 76 can be constructed of plywood, with cushion 78 preferably constructed of a compressible synthetic foam material. The cushion density preferably is rated at about 3.4, for a seat more firm than an average or typical seat. A pivot pin 80 is fixed to the platform, with a shaft 82 of the pivot pin contained in an opening through the platform. A washer 84 is secured to the top of the platform with several fasteners 86, and an enlarged head 88 of the pin lies beneath the cushion, in surface contact with the washer. A plastic panel or shim 90 is fastened by an adhesive to a bottom surface of platform 76. An opening through plastic panel 90 accommodates shaft 82 of the pivot pin.

As seen in FIG. 1, seat 74 is removably mounted to seat supporting frame 42. More particularly, a vertical opening 83 through horizontal tube 48 accommodates shaft 82, with the shaft being retained in the opening by a retaining pin 92 inserted through an opening in the shaft. Shaft 82 is free to rotate within the opening, permitting seat 74 to swivel on the seat supporting frame. Swiveling the seat causes panel 90 to rotate relative to horizontal tube 48 and platform members 56 and 58. The plastic panel protects the bottom surface of plywood platform 76, and combines with the channel members to provide a lower coefficient friction (as compared to the plywood). Thus, panel 90 protects the platform and insures relative ease in the swiveling of seat 74.

Seat assembly 16 is secured to tree 18, first by installing mounting bar 20. If desired, a substantially horizontal hole is drilled into the tree to accommodate anchoring segment 26. In any event, the anchoring segment is embedded into the tree by rotating the anchoring segment, preferably through handle segment 30, until the anchoring segment is firmly embedded into the tree and medial segment 28 is disposed vertically with the handle segment below the anchoring segment. With mounting bar 20 thus secured, the remainder of the assembly, including the seat and the seat supporting frame, is mounted by sliding coupling sleeve 44 vertically into receiving sleeve 32. The seat and supporting frame are just as conveniently removed from the mounting bar, by lifting the coupling sleeve out of the receiving sleeve. If desired, a retaining pin 94 (FIG. 1) is employed to maintain the coupling sleeve within the retaining sleeve. Retaining pin 94 is offset from being centered on coupling sleeve 44, to avoid encountering medial segment 28. Alternatively, the pin can be disposed horizontally, yet perpendicular to the handle section.

The relatively snug fit of the receiving sleeve about the coupling sleeve, and handle section 30 underlying the coupling sleeve to support the coupling sleeve by gravity, together ensure that seat supporting frame 42 is securely fixed relative to the tree trunk, in spite of the ease and quickness with which it can be mounted and removed. In practice, mounting bar 20 can be left in place for extended times, for example several months. Throughout this extended time, the mounting bar provides an observation site for multiple episodes of use, each involving quick and convenient installation and removal of seat 74 and seat supporting frame 42 as a unit.

When it is desired to transfer seat assembly 16 to a different observation site, mounting bar 20 is removed from tree 18. Such removal can be difficult, particularly if the mounting bar has remained in the tree for an extended period of time. To facilitate removal of the mounting bar, rod 72 at the distal end of horizontal tube 48 is inserted upwardly into receiving sleeve 32. With rod 72 thus inserted, the rod and tube 48 combine to provide the necessary leverage to rotate anchoring segment 26 and thereby remove the mounting bar.

Thus in accordance with the present invention, the embedded mounting bar and removably secured seat supporting frame cooperate to provide a convenient means for removably securing a seat or platform on a tree, post or other vertical support member.

What is claimed is:

1. A portable, tree mountable support assembly, including:

a substantially rigid mounting framework including an elongate anchoring segment, an elongate receiving means comprising an elongate rectangular receiving tube substantially perpendicular to the anchoring segment, and a handle segment joined to the receiving means and spaced apart from the anchoring segment, said anchoring segment including a converging threaded end portion to facilitate penetration of the anchoring segment into a tree trunk with the anchoring segment substantially horizontal and selectively angularly positionable to orient the receiving means vertically, said handle segment and said receiving means cooperating to provide a crank for rotating the anchoring segment to effect the penetration of the anchoring segment;

a substantially rigid supporting framework removably mounted on the mounting framework, said supporting framework including an elongate coupling means comprising an elongate and rectangular coupling tube slidable toward and away from a nesting engagement with the receiving means and maintained in said nesting engagement by gravity, an enlongate rectangular tube joined to the coupling means and extending horizontally away from the tree trunk when the coupling means is in said nesting engagement, and an inclined brace secured to the rectangular tube and to the coupling tube; and a support member mounted on the frame member;

wherein the rectangular coupling tube has exterior horizontal profile dimensions slightly less than corresponding horizontal interior profile dimensions of the rectangular receiving tube whereby the coupling tube nests within the receiving tube in a manner to prevent the coupling tube from pivoting about a vertical axis relative to the receiving tube.

2. The assembly of claim 1 wherein:

the top portion of the coupling tube projects upwardly beyond the receiving tube, and the brace is secured to the top portion of the coupling tube.

3. The assembly of claim 2 wherein:

a proximal end of the horizontal tube is spaced apart from the coupling tube to define a gap, the receiving tube includes a vertical wall having a thickness slightly less than the width of the gap, and the proximal end of the horizontal tube and the coupling tube are disposed on opposite sides of the vertical wall when the coupling tube and the receiving tube are in said nesting engagement.

4. The assembly of claim 1 wherein:

the support member is a seat having a rigid, horizontal platform and an elastically deformable cushion secured onto the platform.

5. The assembly of claim 4 further including:

a means for mounting the horizontal platform for rotation on a vertical axis with respect to the supporting framework.

6. The assembly of claim 5 wherein:

the means for mounting the platform comprise a vertical opening through the elongate frame member near a distal end thereof, and an elongate pivot pin fastened to the platform and extended downwardly from the platform, said pivot pin insertable through the vertical opening.

7. The assembly of claim 6 further including:

an aperture formed through the pivot pin, and a retaining pin through the aperture for releasably securing the seat to the elongate frame member.

8. The assembly of claim 6 further including:

a plastic layer secured to the platform and disposed between the platform and the seat supporting framework.

9. The assembly of claim 1 wherein:

the supporting framework comprises a tool segment removably insertable into the receiving tube to facilitate use of the supporting framework to rotate the anchoring segment for alternatively installing and removing of the mounting framework.

10. The assembly of claim 9 wherein:

the tool segment comprises an elongate rod secured to and extending from a distal portion of the elongate frame member.

11. A portable, tree mountable support assembly, including:

a substantially rigid mounting framework including an elongate anchoring segment and an elongate receiving tube extending substantially perpendicular to the anchoring segment and having a non-circular profile, said anchoring segment including means at one end thereof to facilitate penetration of the anchoring segment into a tree trunk with the anchoring segment substantially horizontal and selectively angularly positionable to orient the receiving tube vertically;

a substantially rigid supporting framework removably mounted on the mounting framework, said supporting framework including an elongate coupling tube movable toward and away from a nesting engagement with the receiving tube and maintained in said nesting engagement by gravity, an elongate frame member joined to the coupling tube and extending horizontally away from the tree trunk when the coupling tube is in said nesting engagement, and an inclined brace secured to the elongate frame member and to the coupling tube; and a support member mounted on the frame member;

wherein the coupling tube has a non-circular horizontal profile corresponding in shape and size to the profile of the receiving tube in a manner to prevent the coupling tube from pivoting about a vertical axis relative to the receiving tube when in said nesting engagement.

12. The assembly of claim 11 wherein;

the coupling tube and the receiving tube are rectangular, and exterior horizontal profile dimensions of the coupling tube are slightly less than corresponding horizontal interior profile dimensions of the receiving tube whereby the coupling tube nests within the receiving tube.

13. The assembly of claim 12 wherein:

said mounting framework further includes a handle segment joined to the receiving tube and spaced apart from the anchoring segment whereby the handle segment and receiving tube cooperate to provide a crank for rotating the anchoring segment to effect the penetration of the anchoring segment, said handle segment further being disposed below the anchoring segment, a lower portion of the coupling tube when in said nesting engagement projecting downward beyond the bottom of the receiving tube to engage the handle segment.

14. A portable, tree mountable support assembly, including:

a substantially rigid mounting framework including an elongate anchoring segment and an elongate receiving tube extended substantially perpendicular to the anchoring segment and having a non-circular profile, said anchoring segment including means at one end thereof to facilitate penetration of the anchoring segment into a tree trunk by rotating the anchoring segment with the anchoring segment substantially horizontal, and selectively angularly positionable to orient the receiving means vertically;

a substantially rigid supporting framework removably mounted on the mounting framework, said supporting framework including an elongate coupling tube movable toward and away from a nesting engagement with the receiving tube and maintained in said nesting engagement by gravity, an elongate frame member joined to the coupling tube and extending horizontally away from the tree trunk when the coupling tube is in said nesting engagement, and an elongate tool segment mounted to the frame member and extended away from the frame member, said tool segment being removably insertable into the receiving tube to facilitate use of the frame member to rotate the anchoring segment for alternatively installing and removing the mounting framework.

15. The assembly of claim 14 wherein:

said means to facilitate penetration of the anchoring segment comprise a converging threaded end portion of the anchoring segment.

16. The assembly of claim 14 wherein:

the tool segment comprises an elongate rod secured to and extending from a portion of the elongate frame member remote from the coupling tube.

* * * * *